United States Patent [19]

Hocken

[11] 4,392,122
[45] Jul. 5, 1983

[54] MAGNETICALLY TRIGGERED ON-BOARD ELAPSED TIME INDICATOR

[76] Inventor: Redvers A. Hocken, 1195 Pershore Rd., Stirchley, Birmingham, England

[21] Appl. No.: 277,399

[22] Filed: Jun. 25, 1981

[30] Foreign Application Priority Data

Jun. 26, 1980 [GB] United Kingdom ............. 8020899
Apr. 29, 1981 [GB] United Kingdom ............. 8113188

[51] Int. Cl.³ ............................................. G08B 21/00
[52] U.S. Cl. ............................ 340/323 R; 73/490; 324/179; 340/62; 340/309.15; 340/670; 346/18
[58] Field of Search ........... 340/323 R, 309.4, 309.1, 340/52 R, 62, 670; 324/179, 160; 73/490; 180/167, 168, 171; 346/18; 235/92 GA, 92 TA

[56] References Cited

U.S. PATENT DOCUMENTS

| | | | |
|---|---|---|---|
| 2,351,707 | 6/1944 | Rouprich | 340/323 R |
| 3,609,678 | 9/1971 | Fayling | 180/167 |
| 3,742,195 | 6/1973 | Randlz | 324/179 |
| 3,980,868 | 9/1976 | Thompson | 340/309.4 |

*Primary Examiner*—Glen R. Swann, III
*Attorney, Agent, or Firm*—LeBlanc, Nolan, Shur & Nies

[57] ABSTRACT

A vehicle such as a speedboat or racing car is equipped with a magnetic sensing coil (22) for producing electrical signals in response to detection of magnets disposed at one or more positions along the course. In the case of buoy-mounted markers, the magnets (26) may be mounted on certain of the buoys (10,13,14,17). The output from the sensing coil (22) is used to control on-board timing circuitry to enable the average vehicle speed over the course to be determined and displayed.

17 Claims, 8 Drawing Figures

MAGNETICALLY TRIGGERED ON-BOARD ELAPSED TIME INDICATOR

DESCRIPTION

BACKGROUND OF THE INVENTION

This invention relates to a system for providing on-board timing for a vehicle traversing a predetermined course. The invention is applicable for example to sports such as water skiing and allied water sports where an on-board measure of boat speed is required, and also motorcar and motorcycle racing where there is a requirement for lap times and speeds to be conveyed to the drivers.

In water skiing events such as slalom and jumping, the rules require the boat speed to be maintained within certain limits for the run to be valid. For example, in the slalom event the boat traverses a course defined by successive pairs of buoys, the boat being driven between the buoys of each pair whilst the skier executes a prescribed slalom course. To ensure that each competitor receives the same advantage, the boat is driven at a certain prescribed speed, for example 36 m.p.h., and stop watch timing has been used in the past to ensure that the average boat speed over the course does not deviate from the prescribed spped by more than a specified amount, e.g. plus or minus 0.2 m.p.h.

The stop watch-timed period is made by an on-board official using buoys at the beginning and end of the course as reference points. Hitherto this has been considered unsatisfactory as the accuracy of timing is dependent on the official's reflexes and may vary over the course of several runs. Also the average boat speed can only be checked after the boat has completed the course.

Attempts have been made to eliminate the human element in timing but no satisfactory proposal has yet been made. One timing system which has been adopted but which did not progress beyond the experimental stage involves providing inertia-type switches on the entrance and exit buoys of the course which were intended to close in response to rocking of the buoys during passage of the boat, switch closure being effective to trigger a radio transmitter and emit a signal for reception by a receiver on the boat. This system was found to be unsatisfactory for a number of reasons, e.g. the radio transmitter carried by the buoys has to be powered by an on-shore power supply source making it necessary to connect each buoy to the supply source by supply lines of considerable length. Also, the switches were found to be unreliable in that they did not always close in response to passage of the boat.

Another proposal which has been considered is the use of infra-red beams produced between the entrance and exit buoys. However, this has been rejected because of the difficulty of powering the buoy mounted beam transmitters and receivers and associated circuitry, battery power being undesirable because of the considerable increase in the weight of the buoys and hence risk of injury to the skiers in the event of collision at speed with a heavy buoy. Moreover, there is the added complication of achieving beam alignment with the receivers due to vertical and tilting motion of the buoys when disturbed by the approaching boat and choppy water, and of protecting the electrical components from the inevitable environmental hazards.

Thus, whilst the shortcomings of hand timing to check boat speeds have been recognised for many years, no satisfactory alternative has been found.

In the case of motorcar and motor-cycle racing, the usual method of conveying lap times and speeds to drivers is by means of a display board held up at the track side and kept up to date by members of each driver's backup team. Although this is a rather unsatisfactory method bearing in mind the high speeds attained nowadays in for example Formula 1 racing, an acceptable alternative has not hitherto been found.

SUMMARY OF THE INVENTION

The object of the present invention is to provide a system for producing on-board timing for vehicles such as boats used in water sports and racing cars and motorcycles.

According to the present invention we provide a system for on-board timing for a vehicle traversing a predetermined course, said system comprising sensing coil means adapted to be carried by the vehicle for producing an electrical signal in response to sensing at least one magnet located at at least one predetermined position along said course, on-board timing means and on-board control means responsive to said sensing coil means for controlling operation of the timing means to provide a record of the time interval elapsing between successive or selected electrical signals produced by said sensing coil means.

The record of the time interval may be direct in terms of the actual time elapsed and/or indirect—for example in terms of the average speeds of the vehicle over the elapsed time interval. Thus, in the latter case, the distance between the positions at which said successive or selected signals are produced will be known and the average speed may be determined by dividing the known distance by the time interval elapsing between said signals.

In the case of water skiing and allied sports, said course will be defined by a number of buoys at least one of which will have a magnet (preferably a permanent magnet) associated with it.

In practice, there will be at least two buoys each provided with a magnet so that one buoy can be used for starting the timing means and the other for stopping the timing means. For slalom skiing, at least one set of at least three such buoys is conveniently provided and the timing means preferably comprises two timers so that the buoys of the or each set may be used as entrance, exit and intermediate reference points, the arrangement being such that both timers are started as the boat passes the entrance buoy, one timer is stopped as the boat passes the intermediate buoy and the second timer is stopped as the boat passes the exit buoy. Thus, the second timer provides an indication of average boat speed over the full length of the course and the first timer provides an indication of average boat speed after part of the course has been traversed. This facility is particularly advantageous as it enables mid-course corrections to boat speed to be made to ensure that the average speed over the complete course is within the specified range for the prescribed speed. In some circumstances, e.g. the ski jump event, the intermediate buoy may not be required and, in this case, only the second timer is necessary.

Preferably each magnet is provided on the respective buoy in such a way that the magnetic field strength is substantially isotropic about a vertical axis when water borne. Alternatively, each magnet may create an anisotropic field, e.g. a bar magnet, and in this event special provision may be necessary to restrain the buoy against rotation when water borne, the arrangement being such that the dominant component of field strength is directed generally broadside on with respect to the direction of movement of the boat along the prescribed course.

A feature of the invention in a narrower aspect thereof is the provision of means for discriminating between the magnetic fields of the buoy mounting magnets and the magnetic fields originating from other sources. In practice a major source of extraneous magnetic fields will be the engine powering the boat and, in particular, the electrical ancillaries such as the ignition coil and alternator associated with the engine. Preferably such discrimination is achieved by employing a magnetic sensor having directional properties and orienting the sensor so as to minimise the influence of magnetic fields originating from the engine and maximise the influence of magnetic fields originating from the buoy mounted magnets.

In the preferred embodiment, the sensor includes an electrical coil in which an EMF is induced by the buoy mounted magnets as the boat moves past the buoys. To some extent, the desired sensor directional property can be achieved by using an elongated coil and arranging it broadside on relative to the boat. Surprisingly however it has been found that a pronounced directional effect is obtained if the coil is provided with a core of high magnetic permeability material and the core is arranged to project beyond at least one and preferably both ends of the coil. With such an arrangement, the coil surprisingly shows a marked sensitivity in the axial direction and the coil and core are therefore disposed broadside on with respect to the boat and hence endwise on with respect to the magnets whose polar axes will be disposed substantially vertically. The core may comprise a single ferrite rod or two or more ferrite rods located alongside each other and preferably the core extends beyond the coil by an amount corresponding to at least 100% of the axial length of the coil and in general it would appear that the greater the projection of the core from the coil the more pronounced the directional effect; however, it will be appreciated that there will be a lower limit on how short the coil can be made if a reasonably strong induced signal is to be obtained.

As applied to water skiing for example, the present invention contemplates the use of a permanent magnet/magnetic sensor arrangement which enables a signal to be produced even when the sensor is at least 18 inches from the magnet. In a prototype arrangement, it has been possible to obtain output signals from the sensor at up to and beyond a range of about 18 feet and, in general, the magnet/sensor arrangement will be such that a sensor output can be obtained at a range of up to 10 feet. The sensitivity of the sensor device may be selectively variable to define a maximum range within which the sensor can produce an output signal in response to detection of the magnet and this range is conveniently variable between two and fourteen feet. Thus, for example, electronic circuitry associated with the sensing element may include a threshold detector such as a Schmitt trigger and manually operable means may be provided to adjust the threshold detector or the incoming signal level so that the threshold detector only produces an output when the sensor is within the desired range relative to the magnet.

As applied to for example motorcar or motorcycle racing, the magnet or magnets are preferably located at a single position around the circuit, e.g. at the start/finish line, and the signals for controlling the timing means are produced each time the vehicle and hence the sensing coil means crosses the start/finish line. There is conveniently a number of magnets located at spaced intervals lengthwise of the start/finish line and the magnets may be arranged within a tube or the like embedded in the ground below the position (e.g. the start/finish line) at which triggering of the on-board timing means is required to occur. Thus, by appropriate spacing of the magnets at the desired position, it is possible to ensure that the timing means on board each vehicle is triggered even though two or more vehicles may be side-by-side as they pass over the triggering position.

Although the construction of the sensing coil as used in motor car racing may be as described hereinbefore, it has been found that the directional effect previously mentioned is much less significant when the magnets are relatively close to the coil. For example, in practice the sensing coil may be located within the vehicle body about 6 inches above ground level and the magnets may be embedded about 12 inches below ground level with the net result that the spacing between the sensing coil and the magnets is only of the order of 18 inches compared with typical spacings of the order of 6 to 10 feet in the case of water slalom skiing. The loss in directional effect however is not as important in the case of racing cars because such vehicles tend to employ the minimum of electrical equipment and consequently problems due to magnetic fields emanating from the engine are less significant. Nevertheless, it has been found preferable to orientate the sensing coil endwise on with respect to the magnets (i.e. substantially vertical when the magnets are disposed as previously mentioned) otherwise spurious triggering signals may be generated through pickup of the earth's magnetic field especially when the vehicle travels around relatively sharp bends on the circuit. In an alternative arrangement, the magnets may be located above the track on for example an overhead gantry extending across the width of track at or in the vicinity of the start/finish line. In this event, the magnets may be disposed at a substantial distance from the level of the sensing coils as vehicles pass beneath the gantry thus enabling the directional affect to be taken advantage of.

The magnets are preferably permanent magnets but when the timing system is used for car racing, it will be feasible to use electro magnets rather than permanent magnets; however the latter are preferred because electromagnets would tend to consume large amounts of electrical energy as they would need to be continuously energised for the duration of each race and also pre-race practice.

BRIEF DESCRIPTION OF THE DRAWINGS

To promote further understanding of the invention reference is now made to the accompanying drawings in which.

DESCRIPTION OF THE PREFERRED EMBODIMENTS

Figure 1:
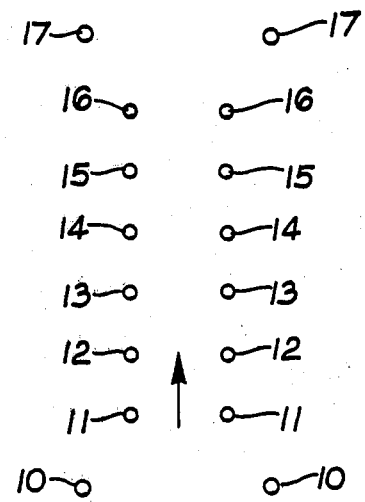
FIG. 1 is a diagrammatic view showing the course to be traversed by a boat whilst towing a water skier.

Referring firstly to FIG. 1, the course to be traversed by a boat 20 is defined by successive pairs of buoys 10-17. When the boat is travelling in the direction indicated by the arrow, the buoys 10 constitute an entrance gate, the buoys 17 constitute an exit gate and the remaining pairs of buoys act as guides. When the boat is travelling in the opposite direction, it will be appreciated that the roles of the buoys 10 and 17 are reversed. Each of the buoys 10, 13, 14 and 17 is provided with a permanent magnet for detection by a sensor mounted on the boat.

Figure 3:
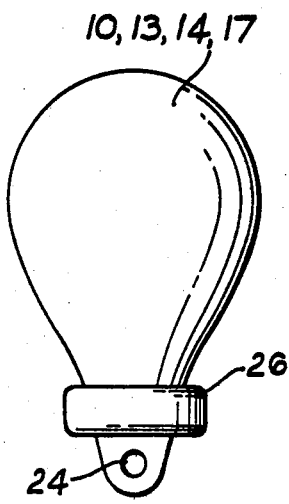
FIG. 3 is a view of a buoy having a magnet mounted thereon.

As shown in FIG. 3, each buoy is generally rotationally symmetric about a vertical axis and may be manufactured as a plastics moulding. Each buoy is formed with a through bore at its lower end for reception of a pin 24 or the like by means of which the buoy can be anchored in place. Although, in the case of the buoys 10, 13, 14 and 17 the permanent magnet can be mounted in any suitable manner, as shown in FIG. 3, the permanent magnet is conveniently in the form of a ring magnet which fits over the reduced diameter lower end of the buoy and is held in place by the pin 24. The magnet 26 is arranged with its polar axis substantially vertical and produces a substantially isotropic magnetic field with respect to the vertical axis so that detection of the magnets by the sensor is not affected by rotation of the buoys.

Figure 2:
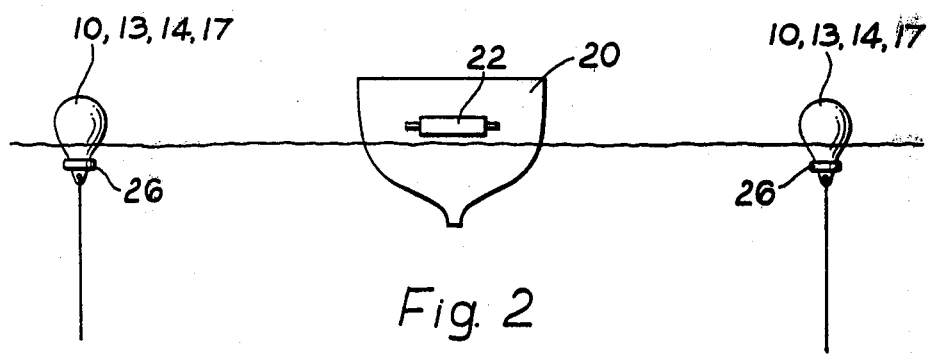
FIG. 2 is an end view showing the arrangement of the boat mounted sensor relative to magnets mounted on the buoys.

As shown in FIG. 2, the sensor 22 is mounted within the boat so as to be substantially horizontal and the sensor axis is directed generally endwise-on towards the magnets 26 associated with the buoys 10, 13, 14 and 17 disposed on either side of the boat. The magnets are all of substantially the same field strength and, it will be noted, are located beneath water level. Because the magnets all have the same strength and are located on both sides of the course, the sensor 22 can detect at least one or the other of each pair 10, 13, 14 and 17 irrespective of the precise path followed by the boat as it traverses the course. This can be important because the forces exerted by the skier in practice can be quite substantial and may cause the boat to deviate from a central path between the buoys.

Figure 4:
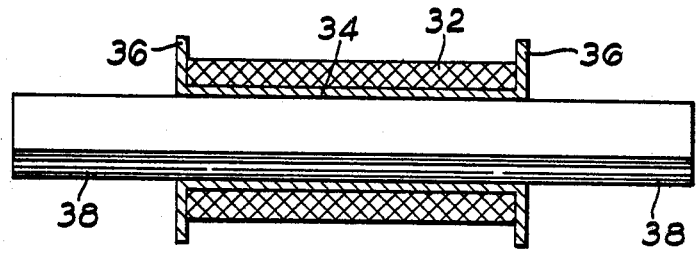
FIG. 4 is a longitudinal sectional view of an electrical coil forming part of the sensor.
Figure 5:
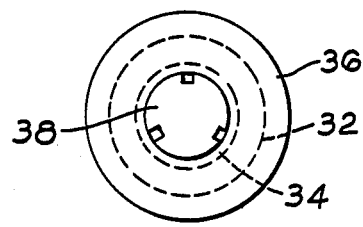
FIG. 5 is an end view of the coil shown in FIG. 4.

Referring now to FIGS. 4 and 5, the sensor includes an electrical coil 32 wound on a cylindrical former 34 having end flanges 36. The coil has a core of magnetically permeable material constituted, by one or more ferrite rods 38 arranged in the manner shown so that the rod projects substantially beyond at least one end and preferably both ends of the coil. This arrangement of the core has, as previously mentioned, been found to give a pronounced directional effect, i.e. the sensor being considerably more sensitive to magnetic sources lying along its axis. Thus, by appropriate location of the sensor, any extraneous magnetic fields emanating from the boat engine and electrical ancillaries may be eliminated.

Figure 6:
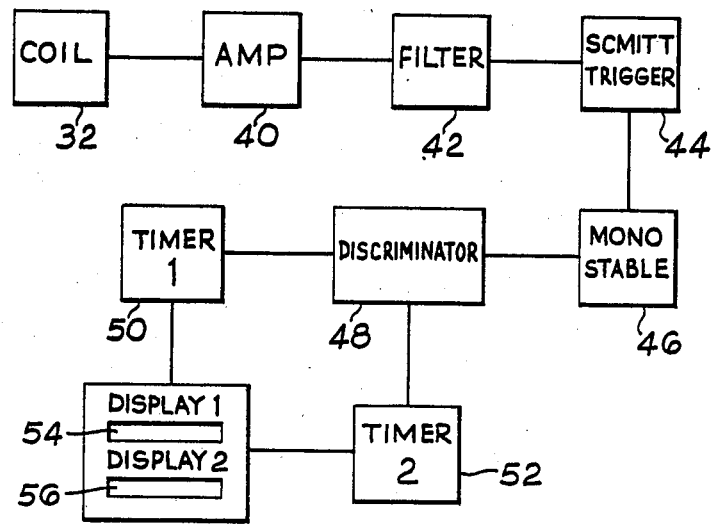
FIG. 6 is a schematic block diagram of circuitry used in processing the signal derived from the sensor.

As the sensor moves past one of the buoy mounted magnets, an EMF will be induced in the coil 32 and this signal may be processed by the circuitry shown in FIG. 6 so as to provide control signals for a timing device. As shown in FIG. 6, the coil signal is fed to an amplifier 40 to increase the signal level and then to a filter 42 for filtering out extraneous signals. The circuitry may include a suitable feedback loop (not specifically shown) so as to filter out other undesirable transient signals which may arise from, for example, the ignition coil and alternator. The filtered signal is applied to a threshold detector 44 which may be in the form of a Schmitt trigger so that the detector 44 only produces an output in response to an input signal whose magnitude exceeds the threshold level (which may be adjustable). The output of the detector 44 is connected to a monostable multivibrator 46 which, in response to an output signal from the detector, provides a short duration pulse (for example 0.25 seconds) which is fed to a discriminator 48. The discriminator 48 serves to determine whether the pulse produced by the multivibrator 46 is the first, second, third or fourth of a series generated during one traverse of the course by the boat. If the pulse corresponds to movement of the boat past the buoys 10 and therefore constitutes the first pulse, the discriminator 48 produces simultaneous signals which are fed to two timers 50, 52 so as to initiate timing by both timers. In response to the second pulse, the discriminator stops the timer 50 and also a display 54 associated with the timer 50. The second pulse, of course, corresponds to movement of the boat past the buoys 13 and therefore the time recorded on the display 54 represents the time taken for the boat to move from buoys 10 to buoys 13. The third pulse detected as the boat moves past the buoys 14 is ignored when the boat is travelling in the direction of the arrow. In response to the fourth pulse, the discriminator 48 stops timing of the timer 52 and also the display 56 associated with timer 52 thereby recording on display 56 the time taken for the boat to move from buoys 10 to buoys 17. The displays 54, 56 may display actual time elapsed or the time recorded may be translated into average speed and displayed as such.

Thus, during each run, the display 54 provides a mid-course indication of the boat speed and the display 56 provides an overall indication of boat speed. The content of the displays 54 and 56 may be maintained until deliberately reset by means of a reset button accessible to an official. In practice, the reset button will be operated between successive runs after the times on the displays 54 and 56 have been noted. In a modification, the reset may take place automatically, e.g. after expiration of a predetermined time. When the boat makes a reverse run of the course, it will be understood that the first, second and fourth pulses for controlling the timers will be respectively provided by the magnets associated with buoys 17, 14 and 10 and the third pulse, which will be ignored, will be provided by the magnets associated with buoys 13.

As described hereinbefore, the magnets are mounted on the buoys. However, they may be associated with the buoys in other ways, e.g. clipped on, suspended from or mounted within the buoys.

From the foregoing, it will be noted that the invention provides an automatic timing system which, as well as providing an indication of the average boat speed over the complete course, may also provide a mid-course indication so that if at that stage the boat speed deviates from the prescribed speed, suitable adjustment can be made in order to compensate for the deviation and achieve an overall speed within the prescribed limits.

Figure 7:
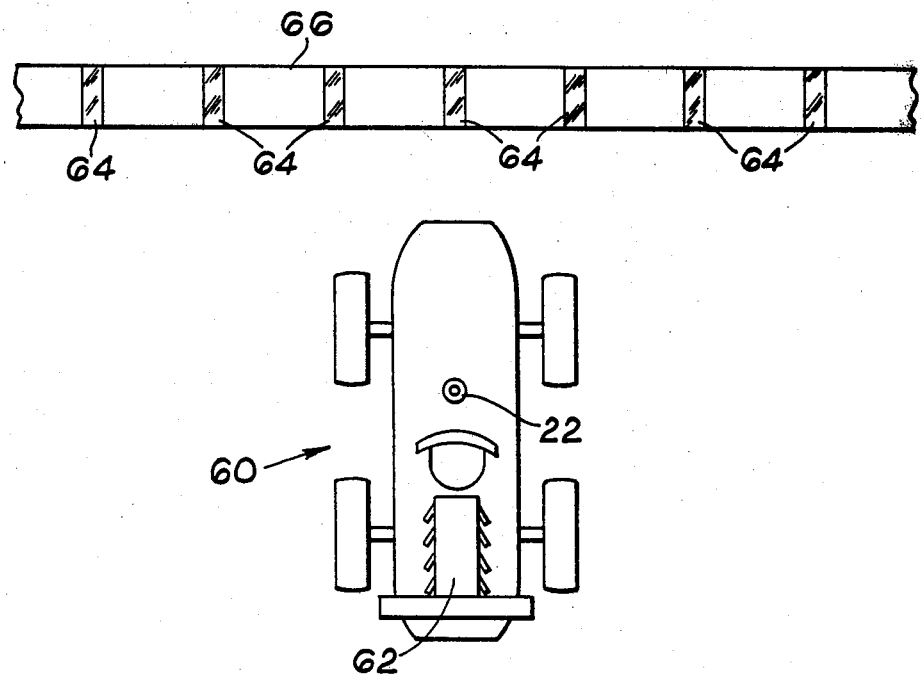
FIG. 7 is a diagrammatic plan view showing the application of the timing system to a racing car.
Figure 8:
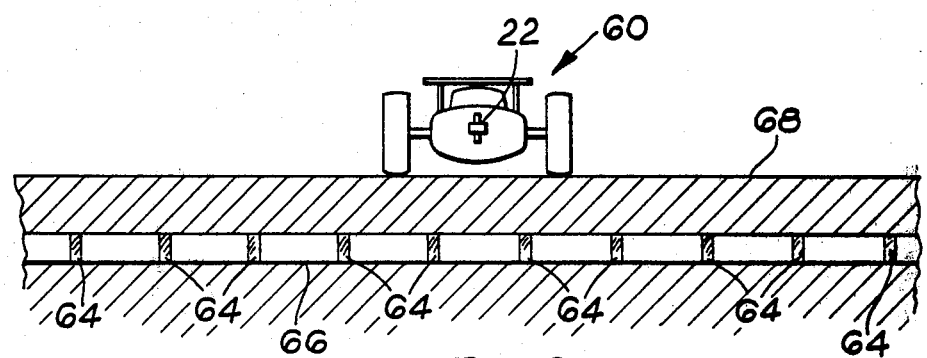
FIG. 8 is a front elevation of the view of FIG. 7.

Referring now to FIGS. 7 and 8, the sensor 22 may be constructed in the manner described hereinbefore but, in this case, is mounted on a racing car 60 preferably at a location spaced well away from the engine 62 and with the coil axis disposed predominantly (and preferably substantially) vertically. At or adjacent the start/finish line of the race circuit, a plurality of magnets 64 are arranged in spaced relation lengthwise of the start/finish line and hence widthwise of the track. As shown, the magnets 64 are located within one or more tubes 66 embedded below ground level 68. Typically the magnets 64 are spaced apart at intervals of about 18 inches and are arranged with their polar axes extending substantially horizontally so that the sensor coils of the car 60 have their axes presented endwise on to the polar axes of the magnet 64.

Each car, in addition to a sensor 22, will also incorporate circuitry similar to that shown in FIG. 6 so as to provide the driver with a display of lap time and/or speed. In this instance however, the timers will be operated alternately so that at the end of each lap the signal produced by the sensor 22 is used to start one timer and stop the other timer which will have been started at the beginning of the lap, the discriminator 48 serving to control alternate operation of the two timers. Thus, upon completion of each circuit, the previously non-operable timer is rendered operable, the time recorded by the timer which has been effective during that circuit is transferred to the display in the form of a time and/or speed read-out and the latter timer is reset. The display is subsequently updated at the completion of the next lap according to the time recorded by the other timer. In this manner, by appropriate location of the display within the car the driver can readily monitor lap times and/or speeds without having to rely on trackside timing and display.

An important advantage provided by the system according to the invention is that the times/speeds for each lap are made available to each driver immediately upon completion of the lap. With conventional trackside timing, such information is always one lap behind which therefore detracts from its value.

In a more sophisticated form of the systems described above, the timing data recorded on-board may be communicated to an external location, e.g. the "pits" in the case of car racing or the "jury tower" in the case of water slalom skiing. Thus, the system may include an on-board radio transmitter or transmitter/receiver and an external radio receiver or transmitter/receiver for location at the pits or the jury tower.

I claim:

1. A system for on-board timing for a vehicle traversing a predetermined course, said system comprising sensing coil means adapted to be carried by the vehicle for producing an electrical signal in response to sensing at least one magnet located at at least one predetermined position along said course, on-board timing means and on-board control means responsive to said sensing coil means for controlling operation of the timing means to provide a record of the time interval elapsing between successive or selected electrical signals produced by said sensing coil means.

2. A system as claimed in claim 1 in which said sensing coil means comprises a coil having a core comprising a magnetically permeable material, said coil being disposed in a predetermined orientation on the vehicle so as to attenuate the affect of magnetic fields generated by an engine powering the vehicle and any electrical equipment associated therewith or the affect of the earth's magnetic field.

3. A system as claimed in claim 2 in which said magnetically permeable core projects from said coil at at least one end of the latter.

4. A system as claimed in claim 3 in which the total amount by which the core projects from the coil is of the order of 100% the length of the coil.

5. A system as claimed in any one of claims 1 to 4 including means for selectively determining with respect to the magnet the maximum range at which the sensor can produce a detectable signal.

6. A system as claimed in any one of claims 1 to 4 in which the vehicle is a water borne vehicle and said course is defined by a number of buoys, the or each magnet comprising a permanent magnet connected to one or more buoys.

7. A system as claimed in claim 2 in which said coil is orientated so that its axis extends substantially perpendicularly to the fore and aft axis of the vehicle.

8. A system as claimed in claim 7 in which the core projects from at least one end of the coil and the coil is orientated so that its axis is directed generally towards the magnet or magnets as the vehicle passes the same.

9. A system as claimed in claim 7 or 8 in which the coil is disposed with its axis extending predominantly horizontally and the or each magnet is disposed with its polar axis extending predominantly vertically.

10. A system as claimed in any one of claims 7 or 8 in which there are at least two buoys each provided with a magnet so that one buoy can be used for starting the timing means and the other for stopping the timing means.

11. A system as claimed in any one of claims 7 or 8 in which at least one set of three of the aforesaid buoys is provided and in which the timing means comprises two timers so that the buoys of the or each set may be used as entrance, exit and intermediate reference points, the arrangement being such that both timers are started as the boat passes the entrance buoy, one timer is stopped as the boat passes the intermediate buoy and the second timer is stopped as the boat passes the exit buoy.

12. A system as claimed in any one of claims 7 or 8 in which two sets of four of the aforesaid magnet bearing buoys are provided, the two sets being arranged on opposite sides of the course in such a way that the buoys of each set are spaced lengthwise of the course and each buoy of one set is aligned perpendicularly of the course with a respective buoy on the other set so that the first and fourth pairs of buoys constitute entrance and exit buoys, or vice versa depending on the direction of travel, and the other two pairs of buoys constitute intermediate buoys, and in which the timing means comprises two timers which are controlled by said control means in such a way that one timer is started and stopped respectively at the entrance and exit buoys and the second timer is started at the entrance buoys and stopped at one pair of the intermediate buoys, the second timer being stopped at the one pair of intermediate buoys when travelling in one direction and at the other pair of intermediate buoys when travelling in the opposite direction.

13. A system as claimed in any one of claims 7 or 8 in which each magnet is provided on the respective buoy in such a way that the magnetic field strength is substantially isotropic about a vertical axis of symmetry of the buoy.

14. A system as claimed in any one of claims 1 to 4 in which the vehicle is a road vehicle and said cores is constituted by a circuit, said magnet or magnets being located at a predetermined position along said circuit to enable lap timing to be effected.

15. A system as claimed in claim 14 in which there are a plurality of said magnets spaced apart widthwise of the course.

16. A system as claimed in claim 14 in which the or each magnet is embedded beneath the surface of the course.

17. A system as claimed in claim 14 in which the coil is disposed with its axis extending predominantly vertically and the or each magnet is disposed with its polar axis extending predominantly horizontally.

* * * * *